R. E. McINTIRE.
SHAFT COUPLING FOR REELS.
APPLICATION FILED MAY 17, 1913.
1,211,865.
Patented Jan. 9, 1917.
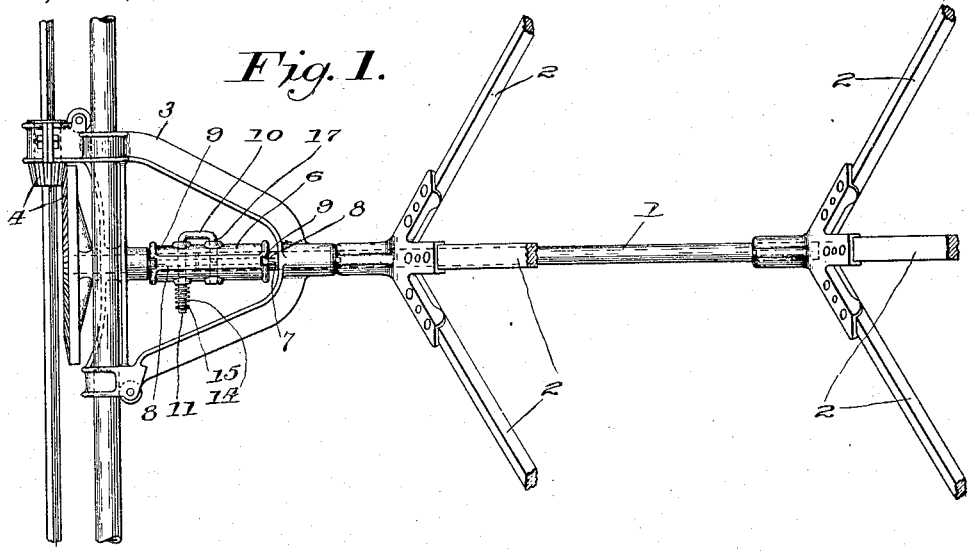
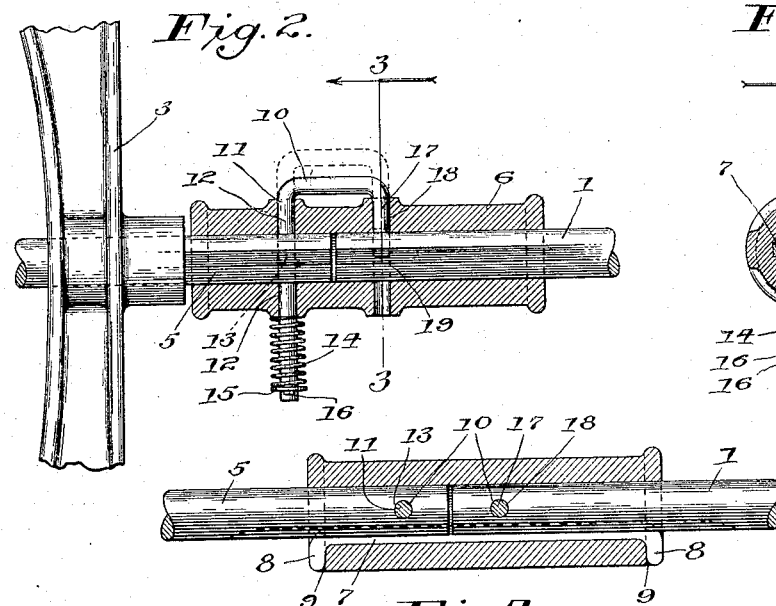
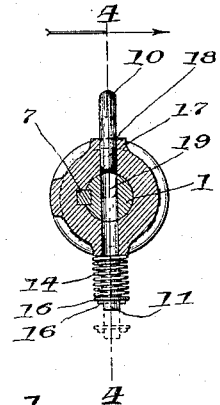
Witnesses:
C. E. Palmer
Inventor
Richard E. McIntire,
By Chas. E. Lord
Atty.

UNITED STATES PATENT OFFICE.

RICHARD E. McINTIRE, OF CHICAGO, ILLINOIS, ASSIGNOR TO INTERNATIONAL HARVESTER COMPANY OF NEW JERSEY, A CORPORATION OF NEW JERSEY.

SHAFT-COUPLING FOR REELS.

1,211,865.  Specification of Letters Patent.  Patented Jan. 9, 1917.

Application filed May 17, 1913. Serial No. 768,343.

*To all whom it may concern:*

Be it known that I, RICHARD E. McINTIRE, a citizen of the United States, residing at Chicago, in the county of Cook and State of Illinois, have invented certain new and useful Improvements in Shaft-Couplings for Reels, of which the following is a full, clear, and exact specification.

My invention relates to reels for harvesters, headers and the like.

It has for its object to attach a reel to a harvester, header or the like, in an improved manner so that when it is desired to reduce the bulk of the machine, as, for instance, for shipping or storing, the reel may be readily removed. I attain this object by providing improved means carried upon the reel support and coöperating with the reel shaft normally locking the latter to the support, but at all times readily operable to unlock the same therefrom.

In order that my invention may be clearly and fully disclosed, I have illustrated one embodiment thereof in the accompanying drawings. It is to be understood, however, that the embodiment shown herein for purposes of illustration may be modified.

Figure 1 is a side elevation of the reel and reel support. Fig. 2 is a longitudinal sectional view of the attaching means. Fig. 3 is a transverse sectional view on line 3—3 of Fig. 2. Fig. 4 is a longitudinal sectional view on line 4—4 of Fig. 3.

In the construction shown a reel shaft 1 carrying reel arms 2 is carried in a suitable reel support 3 and driven from a suitable power connection through gearing 4 and a stub shaft 5 journaled in the support 3, improved means being provided between the inner end of the reel shaft 1 and the outer end of the stub shaft 5 for locking the shaft thereto and enabling the same to be readily separated therefrom. This connection comprises a tubular member or sleeve 6 which is fitted over the end of the stub shaft 5, the reel shaft 1 and the stub shaft 5 being locked against relative rotation with respect thereto by a suitable longitudinally extending removable key or spline 7 having bent over ends 8 received in openings 9 in the ends of the sleeve. As shown, this sleeve 6 is locked against longitudinal separation from the shaft 5 by means of a transversely movable substantially U-shaped locking member 10 having a long arm 11 which extends through oppositely located openings 12 in the sleeve 6 and a registering bore 13 in the shaft 5 and protrudes beyond the periphery of the sleeve; a spiral spring 14 encircling the protruding end thereof and having its ends abutting against the sleeve 6 and a washer 15 positioned on the locking member in any suitable manner, as by a cotter pin 16. The other arm 17 of the U-shaped locking member 10 is preferably shorter than the arm 11. This arm 17 protrudes into an opening 18, in alinement with the openings 12, in the sleeve 6 and passes down into a registering bore 19 in the shaft 1 to lock the latter against longitudinal separation from the shaft 5, and at the same time insure the rotation of the shaft 1 with that shaft.

It is to be noted that in this construction the shafts 1 and 5 are securely locked together, the spring 14 normally tending to hold the locking member 10 in its locking position so that the shaft 1 rotates with the shaft 5. When, however, it is desired to remove the reel, this is readily accomplished by pulling out the locking member against the pressure of the spring, to the dotted line position shown in Fig. 2, wherein its locking arm 17 is removed from the bore 19 in the end of the shaft 1 and the latter shaft is free to be readily removed by slipping it out of the collar or sleeve 6. Here attention should also be directed to the fact that due to its spring connection when the member 10 is moved transversely, it is never disengaged from the shaft 5, being retained upon the end of the same ready to receive the reel 1 when the machine is again assembled. When reassembling the machine, it should also be noted that the splined connection between the sleeve and the shaft 1, in addition to its function of giving a positive drive to the parts independent of the transversely movable locking member, also acts as a guide in the insertion of the shaft 1 in the sleeve, insuring the alinement of the opening in the end of that shaft with the openings in the sleeve so that when the shaft is pushed through to the desired point, the locking member may be snapped into the same without difficulty.

While I have in this application described one form which my invention may assume in practice, it is, of course, to be understood that the form shown herein for purposes of illustration is susceptible of modification without departing from the spirit of my invention.

What I claim as my invention and desire to secure by Letters Patent is:

1. In a reel support, a frame, a power shaft journaled thereon, a sleeve protruding beyond the end of said power shaft, a reel shaft seated in said sleeve, said shafts and sleeve having registering openings therein, and a U-shaped member for attaching said reel shaft to said power shaft having arms of different lengths reciprocable through the registering openings in said shafts and sleeve.

2. In a reel support, a frame, a power shaft journaled thereon, a sleeve carried on said power shaft, a reel shaft seated in said sleeve, said shafts and sleeve having registering openings therein, and a transversely movable spring-pressed member normally locking said reel shaft to said power shaft having arms of different lengths reciprocable in the registering openings in said shafts and sleeve.

3. In a reel support, a frame, a power shaft journaled thereon, a sleeve fixed to said power shaft, a reel shaft carried in said sleeve and splined thereto having a transversely disposed opening therein, and a transversely movable spring pressed member carried by said sleeve having a portion thereof normally seated in the opening in said reel shaft and locking the latter to said sleeve.

4. In a reel support, a frame, a power shaft journaled therein, a sleeve carried on the end of said power shaft, a reel shaft receivable in said sleeve and having an opening in its end, and a substantially U-shaped spring pressed locking member protruding transversely through said sleeve and power shaft and having a projection normally seated in the opening in said reel shaft.

5. In a reel support, a frame, a power shaft carried thereon, a sleeve inclosing said power shaft and protruding beyond the end thereof, a reel shaft seated in the open end of said sleeve, reciprocal means for locking said power shaft and sleeve against relative rotation, and operable without interruption of their locking function for locking said reel shaft against longitudinal separation from said power shaft.

6. In a reel support, a frame, a power shaft thereon, a sleeve having one end inclosing the end of said power shaft, a reel shaft received in the opposite end of said sleeve, said sleeve having transversely disposed openings therein registering with corresponding openings in the adjacent ends of said shafts, means for locking said shafts and sleeve against relative rotation, and supplemental laterally retractable means for locking said members against longitudinal separation having portions thereof seated in the registering openings in said sleeve and shafts.

7. In a reel support, a frame, a power shaft journaled thereon, a sleeve having one end thereof inclosing one end of said power shaft, a reel shaft inclosed in the opposite end of said sleeve, said shafts having transversely disposed openings in their adjacent ends and said sleeve having openings therein registering therewith, a U-shaped shaft connecting member having arms of unequal length extending into said openings, one of said arms protruding laterally through said power shaft and sleeve and beyond the periphery of the latter, and a coiled spring carried between the protruding end of said arm and said sleeve normally holding said connecting member in its operative position.

8. In a shaft coupling, a frame, a power shaft journaled thereon, a sleeve carried on said power shaft, a reel shaft carried in said sleeve, said shafts having transversely disposed openings in their adjacent ends and said sleeve having openings therein adapted to register therewith, means between said sleeve and reel shaft whereby the same may only be received in said sleeve when its opening is in alinement with the openings in said sleeve, and transversely reciprocable shaft connecting means continuously connected to one of said elements and reciprocable through said openings.

In testimony whereof I affix my signature in the presence of two witnesses.

RICHARD E. McINTIRE.

Witnesses:
FERDINAND HACKER,
C. H. BURNS.

Copies of this patent may be obtained for five cents each, by addressing the "Commissioner of Patents, Washington, D. C."